No. 742,720. PATENTED OCT. 27, 1903.
C. H. McLAUGHLIN.
AUXILIARY COUPLING DEVICE.
APPLICATION FILED NOV. 7, 1901.
NO MODEL. 2 SHEETS—SHEET 1.
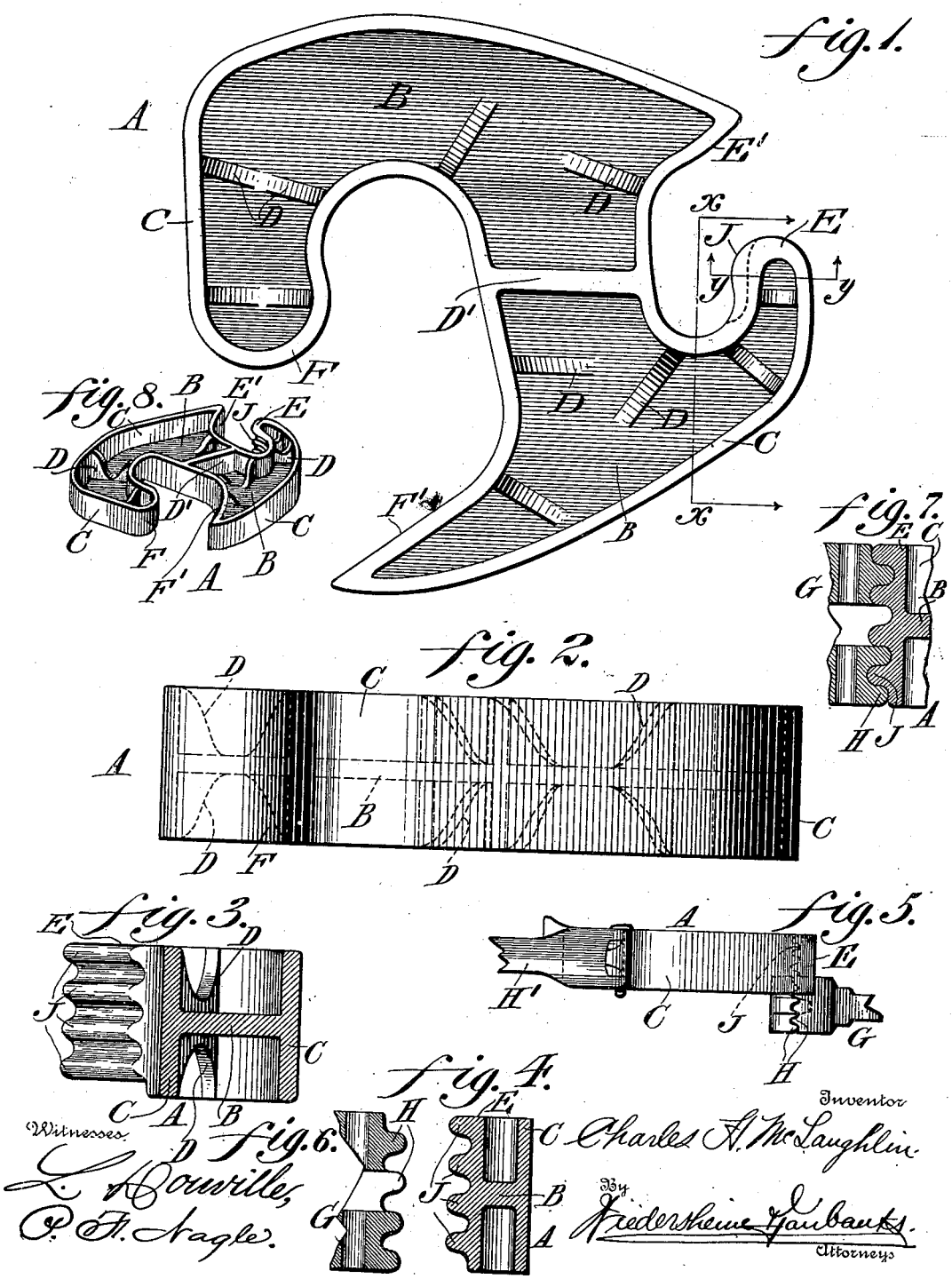

No. 742,720. PATENTED OCT. 27, 1903.
C. H. McLAUGHLIN.
AUXILIARY COUPLING DEVICE.
APPLICATION FILED NOV. 7, 1901.
NO MODEL. 2 SHEETS—SHEET 2.
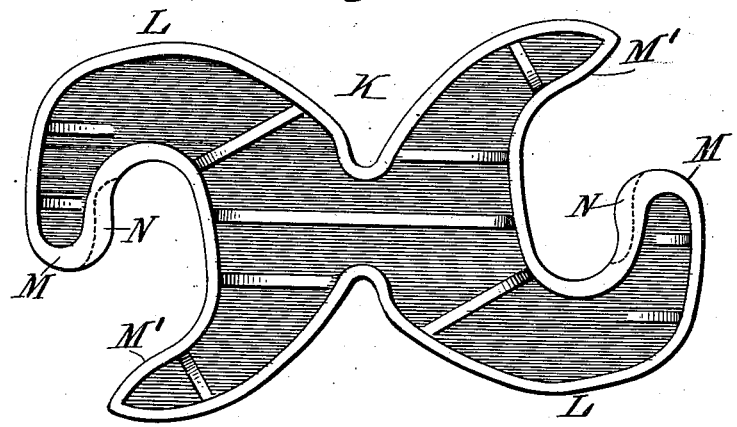
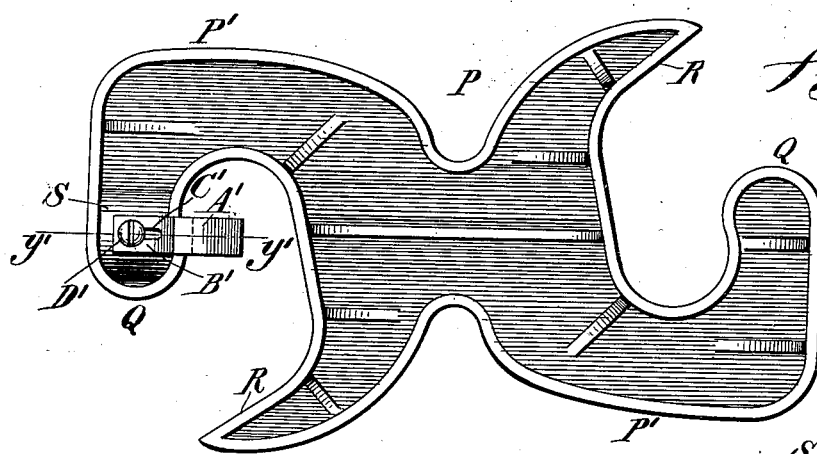
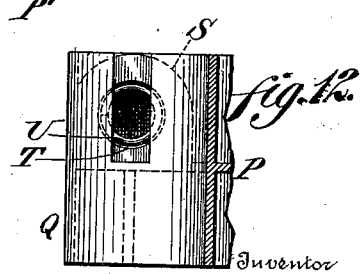
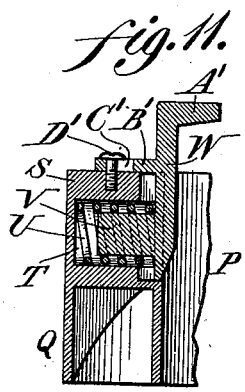
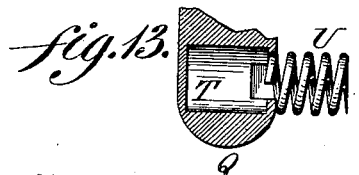

No. 742,720.

Patented October 27, 1903.

UNITED STATES PATENT OFFICE.

CHARLES H. McLAUGHLIN, OF PHILADELPHIA, PENNSYLVANIA.

AUXILIARY COUPLING DEVICE.

SPECIFICATION forming part of Letters Patent No. 742,720, dated October 27, 1903.

Application filed November 7, 1901. Serial No. 81,370. (No model.)

*To all whom it may concern:*

Be it known that I, CHARLES H. MCLAUGHLIN, a citizen of the United States, residing in the city and county of Philadelphia, State of Pennsylvania, have invented a new and useful Improvement in Auxiliary Coupling Devices, of which the following is a specification.

My invention consists of an auxiliary coupling device for coupling car-couplings of the Janney type, as will be hereinafter fully described and claimed.

Figure 1 represents a plan view of a coupling device embodying my invention. Fig. 2 represents a side elevation thereof. Fig. 3 represents a sectional view on line $x\ x$, Fig. 1. Fig. 4 represents a sectional view on line $y\ y$, Fig. 1. Fig. 5 represents a side elevation of a coupling device and a portion of a car-coupling. Fig. 6 represents a sectional view of the end portion of the knuckle of a coupling. Fig. 7 represents a sectional view showing my coupling device in position for engagement with a coupling. Fig. 8 represents a perspective view of the coupling device. Figs. 9 and 10 represent plan views of coupling devices, showing slightly-modified constructions. Fig. 11 represents a sectional view on line $y'\ y'$, Fig. 10. Fig. 12 represents an elevation of a portion of the coupling device shown in Fig. 10. Fig. 13 represents a sectional view showing the manner of inserting the spring in the coupling device.

Similar letters of reference indicate corresponding parts in the figures.

Referring to the drawings, my invention consists, broadly, of an auxiliary coupling device having rigidly-connected interlocking heads at its ends that are adapted to automatically interlock with couplings of the familiar Janney type, having a pivoted knuckle and a guard. These car-couplings are usually constructed on what are known as "Master Car-Builders'" lines, and my auxiliary coupling device, which is indicated as a whole by A, is provided at each end with a coupling-head, which consists of a relatively rigid nose and guard to automatically interlock with the coupling-arm of the pivoted knuckle and the guard of car-couplings of the type referred to.

My coupling device can be made in various different forms—for instance, for the purpose of coupling the car-couplings on a railroad-car and a street-car or the couplings on two street-cars, or, again, the couplings on two railroad-cars—and in the accompanying drawings I have illustrated the different forms of my auxiliary coupling devices that are adapted for these purposes. I will now describe the same in detail.

In Figs. 1 to 8 I have shown a coupling device A as adapted to couple a railroad-car and street-car, the same comprising interlocking heads at each end thereof, consisting, essentially, of noses E and F and guards E' and F'. As the car-couplings in general use are either on Master Car-Builders' lines or closely conforming thereto I have shown the locking-heads corresponding in contour with a car-coupling when the knuckle is closed, so as to automatically couple therewith. In the construction of coupling device A, I form a plate B with a wall C, extending around and above and below the same, as best shown in Fig. 8, and conveniently brace the walls C upon the plate B, for instance, by the ribs D, although it is understood that other forms of braces may be employed to strengthen the casting. I have also shown a longitudinal rib D' extending between the rear portion of the walls C of each locking-head.

It is understood, of course, that it is necessary to provide means for supporting the coupling device upon one of the car-couplings not only to prevent the same from dropping, but to allow the other car-coupling to automatically couple with the locking-head on the other end of the coupling device, and I place these means upon one of the heads, the same consisting conveniently of a downwardly-facing shoulder on the locking-head that engages an opposite face on the knuckle of a car-coupling, and in the particular embodiment of these means in Figs. 1 to 8 I show the inner side of the nose E as provided with a plurality of horizontal ribs and grooves. This nose E is on the locking-head that is adapted to engage the car-coupling on the street-car, the type of street-car coupling being one having ribs and grooves on the coupling-arm of its knuckle, as shown in Figs. 5, 6, and 7, the said ribs and grooves J of the nose E interlocking with the ribs and grooves H of the coupling-arm G of said car-coupling. Thus when the car-coupling and coupling device interlock, as shown in Figs. 5 and 7, the coupling-block is supported. Also by the employment of a plurality of grooves, as I have shown, the coupling device A can be elevated sufficiently in the manner shown in Fig. 5 to be upon the same level as the car-coupling H' of the railroad-car.

In Fig. 9 I have shown a coupling device K, that is designed for coupling car-couplings, for instance, of two street-cars provided with a type of coupling shown in Figs. 5, 6, and 7—that is to say, the said coupling device K is provided with the coupling-heads L, that are duplicates, each of said heads being provided with a nose M and the guard M', said noses being provided with the ribs N, corresponding to the ribs J. (Shown in Fig. 1.)

In Figs. 10 to 13, inclusive, I have shown a coupling device P, that is especially adapted for coupling the car-couplers of two railroad-cars, the same being provided with coupling-heads P', each of which is provided with a nose Q and a guard R. The faces of the noses are plain, and to provide means for supporting these coupling devices upon the car-coupling I preferably attached to one of the noses a suitable device to form a downwardly-facing shoulder on the inside of the nose. This is formed by a member W, having a projection V extending into a socket T, formed in the nose, a spring U being situated within said socket and bearing against the member W to press it inwardly. The said member is provided with an arm D', having a slot C', through which extends the screw of pin D', by means of which it is secured to the nose. Extending inwardly from the upper end of the member W is a projection A', the lower face of which forms the shoulder above referred to and which is adapted to rest upon the upper side of the knuckle of the car-coupling to support the coupling device.

It will thus be seen that I provide a coupling device that not only interlocks the car-couplings of the type referred to, but which is provided with means that support the same upon such a car-coupling, and although in the different embodiments of my invention illustrated I have shown various ways to secure this result, yet except in the claims for the specific construction my invention is not limited thereto, for it is obvious that the broad principle of my invention can be variously embodied under the scope of the appended claims.

It will be apparent that changes may be made by those skilled in the art, and I do not, therefore, desire to be limited in every instance to the exact construction herein shown and described.

Having thus described my invention, what I claim as new, and desire to secure by Letters Patent, is—

1. An auxiliary coupling device consisting of rigidly-connected interlocking heads adapted to couple automatically with car-couplings of the Janney type.

2. An auxiliary coupling device consisting of rigidly-connected interlocking heads, adapted to couple automatically with car-couplings of the Janney type, and means for supporting said auxiliary device upon said car-coupling so that it will be carried thereby.

3. An auxiliary coupling device, consisting of rigidly-connected interlocking heads adapted to couple automatically with car-couplings, one of said heads being provided with means for supporting the same upon a car-coupling so that said device is carried thereby.

4. An auxiliary coupling device, consisting of rigidly-connected interlocking heads, each of said heads consisting of a rigid nose and guard, adapted to couple automatically with a car-coupling.

5. An auxiliary coupling device, consisting of rigidly-connected interlocking heads, each of said heads consisting of a rigid nose and guard conforming to the lines of a car-coupling constructed on Master Car-Builders' lines when the knuckle of the latter is closed and locked, so as to automatically couple with said car-coupling.

6. An auxiliary coupling device, consisting of rigidly-connected interlocking heads, each of said heads comprising a rigid nose and guard, adapted to automatically couple with a car-coupling, and one of said noses being provided with means for engaging a car-coupling to support said device.

7. An auxiliary coupling device, consisting of rigidly-connected heads, each of said heads comprising a rigid nose and guard, adapted to automatically couple with a car-coupling, and one of said noses being provided with an inwardly-extending and downwardly-facing shoulder to engage the locking-knuckle on said car-coupling, whereby the device is supported and carried thereby.

8. An auxiliary coupling device, consisting of rigidly-connected heads, each of said heads comprising a rigid nose and guard, adapted to automatically couple with a car-coupling, and one of said noses being provided with an inwardly-extending and downwardly-facing shoulder to engage the locking-knuckle on said car-coupling, whereby the device is supported and carried thereby, said shoulder being situated above the nose.

9. An auxiliary coupling device, consisting of rigidly-connected interlocking heads, adapted to couple automatically with a car-coupling, and movable means carried by said device adapted to engage a car-coupling, whereby the said device can be supported and carried thereby.

10. An auxiliary coupling device, consisting of rigidly-connected interlocking heads adapted to couple automatically with a car-coupling, and cushioned means carried by said device adapted to engage a car-coupling and support said device, whereby the same is carried by the car-coupling.

11. An auxiliary coupling device, consisting of rigidly-connected interlocking heads, each of said heads comprising a nose and guard, one of said noses being provided with cushioned means adapted to engage the locking-knuckle of the car-coupling, whereby said device is supported and carried by said car-coupling.

12. An auxiliary coupling device having interlocking heads at the ends thereof, each of said heads comprising a locking-nose and guard, one of said noses being provided with an inwardly-projecting cushioned member.

13. An auxiliary coupling device having interlocking heads at the ends thereof, each of said heads comprising a locking-nose and guard, one of said noses having a socket, an inwardly-projecting member movably secured to said nose and having a projection extending into said socket, and a spring in said socket engaging said member.

14. An auxiliary coupling device having interlocking heads at the ends thereof, each of said heads comprising a locking-nose and guard, one of said noses having a socket, an inwardly-projecting member having an arm resting upon said nose and movably secured thereto, and a projection extending into said socket, and a spring in said socket engaging said member.

15. An auxiliary coupling device consisting of a plate, an upright wall extending around and above and below said plate, the contour of said wall at the ends of said device being formed to provide interlocking heads to automatically couple with a car-coupling.

16. An auxiliary coupling device consisting of a plate, an upright wall extending around and above and below said plate, the contour of said wall at the ends of said device being formed to provide interlocking heads to automatically couple with a car-coupling, and strengthening-ribs extending between said upright wall and plate.

17. An auxiliary coupling device consisting of a plate, an upright wall extending around and above and below said plate, the contour of said wall at the ends of said device being formed to provide interlocking heads to automatically couple with a car-coupling, said wall and plate being suitably braced relative to each other.

18. A coupling device for connecting two Master Car-Builders' coupler-heads, comprising a body having a hooked extremity at each end thereof, and a buffing-face between each of said hooked extremities and said body, a guard projection adjacent said buffing-face, and means for supporting the coupling device, substantially as described.

19. An auxiliary coupling device consisting of interlocking heads adapted to couple with car-couplings of the Janney type by engagement with the inner faces of the locking-knuckles thereof, one of said heads having means for supporting the device upon such a car-coupling, and the other head being adapted to couple automatically with such a car-coupling.

20. An auxiliary coupling device consisting of interlocking heads, each of said heads having means for engaging the inner faces of locking-knuckles of car-couplings of the Janney type when said knuckles are in locked position to couple therewith, one of said heads having means for supporting the device upon such a car-coupling, and the other head being adapted to couple automatically with such a car-coupling.

21. An auxiliary coupling device consisting of interlocking heads each of said heads having knuckles to engage and couple with car-couplings of the Janney type, one of said heads having means for supporting the device upon such a car-coupling and the other head being adapted to couple automatically with such a car-coupling.

22. An auxiliary coupling device, consisting of interlocking heads, each of said heads consisting of a nose and guard, one of said heads having means for supporting the device upon a car-coupling, and the other head being adapted to couple automatically with car-couplings of the Janney type.

23. An auxiliary coupling device, consisting of interlocking heads, each of said heads having a nose to engage the locking-knuckle of car-couplings of the Janney type, one of said heads having means for supporting the device upon such a car-coupling, and the other head being adapted to couple automatically with such a car-coupling.

CHARLES H. MCLAUGHLIN.

Witnesses:
JOHN A. WIEDERSHEIM,
HARRY COBB KENNEDY.